US006618695B1

(12) United States Patent
Hu et al.

(10) Patent No.: US 6,618,695 B1
(45) Date of Patent: Sep. 9, 2003

(54) METHOD FOR GRADUALLY DEFORMING A STOCHASTIC MODEL OF A HETEROGENEOUS MEDIUM SUCH AS AN UNDERGROUND ZONE

(75) Inventors: Lin-Ying Hu, Billere (FR); André Haas, Pau (FR); Frédéric Roggero, Pau (FR)

(73) Assignees: Institut Francais du Petrole, Rueil-Malmaison cedex (FR); ELF Ep, Courbevoie (FR)

( * ) Notice: Subject to any disclaimer, the term of this patent is extended or adjusted under 35 U.S.C. 154(b) by 0 days.

(21) Appl. No.: 09/343,219

(22) Filed: Jun. 30, 1999

(30) Foreign Application Priority Data

Jul. 1, 1998 (FR) .............................. 98 09018

(51) Int. Cl.$^7$ ............................ G06F 17/10; G06G 7/48
(52) U.S. Cl. ...................... 703/2; 703/10; 166/250.02; 166/250.16; 367/73
(58) Field of Search ........................ 703/2, 3, 5; 367/73; 356/73.1

(56) References Cited

U.S. PATENT DOCUMENTS

| | | | | |
|---|---|---|---|---|
| 4,817,062 A | * | 3/1989 | De Buyl et al. | 367/73 |
| 5,416,750 A | * | 5/1995 | Doyen | 367/73 |
| 5,479,251 A | * | 12/1995 | Hanson | 356/73.1 |
| 5,621,169 A | * | 4/1997 | Harris et al. | 73/152.18 |

FOREIGN PATENT DOCUMENTS

EP 0567302 10/1993

OTHER PUBLICATIONS

Beyer, HANDBOOK of MATHEMATICAL SCIENCES, 5th Edition, CRC Press, 1985, pp. 730 and 731.*

O'Neil, Peter, "Advanced Engineering Mathematics", Second Edition, © 1987 by Wadsworth, Inc., pp. 705 and 902.*

A. G. Journel and Ch. J. Huijbregts, "Mining Geostatistics", Academic press, 1978, Chapter VII Simulation of Deposits, pp. 491–511.

G. Matheron et al: "Conditional Simulation of the Geometry of Fluvio–Deltaic Reservoirs", paper SPE 16753; SPE Annual Technical Conference and Exhibition, Las Vegas, 1987, 561–599.

(List continued on next page.)

*Primary Examiner*—Hugh Jones
*Assistant Examiner*—Ed Garcia-Otero
(74) *Attorney, Agent, or Firm*—Antonelli, Terry, Stout, & Kraus, LLP

(57) ABSTRACT

Method for gradually deforming, totally or locally, a Gaussian or similar type stochastic model of a heterogeneous medium such as an underground zone, constrained by a series of parameters relative to the structure of the medium. The method comprises drawing a number p, at least equal to two, of independent realizations of at least part of the selected medium model from all the possible realizations, and linear combination of these p realizations with p coefficients such that the sum of their squares is equal to 1. This linear combination constitutes a new realization of the stochastic model and it gradually deforms when the p coefficients are gradually modified. More generally, the method can comprise several iterative gradual deformation stages, with combination at each stage of a composite realization obtained at the previous stage with q new independent realizations drawn from all the realizations. The method makes it possible to gradually deform realizations of a model representative of the medium while modifying the statistical parameters relative to the structure of the medium. The method also allows gradual individual deformations of various parts of the model while preserving continuity between these parts. The method can be applied for construction of stochastic reservoir models constrained by non-linear data (data linked with the flow of fluids).

14 Claims, 6 Drawing Sheets

OTHER PUBLICATIONS

Clayton V. Deutsch: "Conditioning Reservoir Models to Well Test Information", in Soares, A. (ed.), Geostatistics Trola '92, pp. 505–518, Kluwer Academic Pub., 1993, pp. 505–518.

G. de Marsily et al: "Interpretation of Interference Tests in a Well Field using Geostatistical Techniques to Fit the Permeability Distribution in a Reservoir Mode", in Verly, G. et al (ed.), Geostatistics for Natural Resources Characterization, Part 2, pp. 831–849, D. Reidel Pub. Co., © 1984.

Dean S. Oliver: "Moving Averages forGaussian Simulation in Two of Three Dimensions", Math. Geology, vol. 27, No. 8, 1995, pp. 939–960.

"Use of Geostatistics for Accurate Mapping of Earthquake Ground Motion," by James R. Carr et al, appearing in Geophysical Journal, vol. 97, 1989, pp. 31–40. (XP002097135.

"Quantitative Hydrogeology", by Ghislain de Marsily, 1986, Academic Press, Inc., pp. 300–304 (XP002097136).

* cited by examiner

METHOD FOR GRADUALLY DEFORMING A STOCHASTIC MODEL OF A HETEROGENEOUS MEDIUM SUCH AS AN UNDERGROUND ZONE

FIELD OF THE INVENTION

The present invention relates to a method for gradually deforming, partly or totally, realizations or representations of a heterogeneous medium such as an underground zone, which all are the expression of a Gaussian or similar type stochastic model, i.e. including an underlying Gaussian model.

The method according to the invention finds applications notably in the construction of a stochastic model of an underground formation, constrained by non-linear data.

BACKGROUND OF THE INVENTION

Examples of use of Gaussian models for modelling the subsoil structure are described by:

Journel, A. G. and Huijbregts Ch. J.: "Mining Geostatics", Academic Press, 1978, or Matheron, G. et al.: "Conditional Simulation of the Geometry of Fluviodeltaic Reservoirs", paper SPE 16753; SPE Annual Technical Conference and Exhibition, Las Vegas, 1987.

Constraint of stochastic models by a series of non-linear data can be considered to be an optimization problem with definition of an objective function assessing the accordance between data measured in the medium to be modelled and corresponding responses of the stochastic model, and minimization of this function. A good deformation method must respect the following three characteristics: a) the deformed model must be a realization of the stochastic model; b) it must produce a regular objective function that can be processed by an efficient optimization algorithm; and c) the deformation must be such that the solution space can be entirely covered.

The method according to which values are exchanged at two points of a realization of the stochastic model, i.e. a realization or representation of the medium studied that is the expression of the model, can be cited as an example of a known deformation method. This method is used in the technique referred to as "simulated annealing" known to specialists. An example thereof is described by:

Deutch, C.: "Conditioning Reservoir Models to Well Test Information", in Soares, A. (ed.), Geostatistics Troia'92, pp. 505–518, Kluwer Academic Pub., 1993.

As an arbitrary exchange breaks the spatial continuity of a stochastic model, it is necessary to include a variogram in the objective function, which makes optimization very tedious.

Another known method is the method referred to as pilot point method, which is described for example by:

de Marsily, G. et al.: "Interpretation of Interference Tests in a Well Field using Geostatistical Techniques to Fit the Permeability Distribution in a Reservoir Model" in Verly, G. et al. (ed.), Geostatistics for Natural Resources Characterization, Part 2, 831–849, D. Reidel Pub. Co, 1984.

This method essentially consists in selecting a certain number of points of an initial realization (representation), in calculating the derivatives (sensitivity coefficients) of the objective function in relation to the values at these points, and then in modifying the values at pilot points in order to take account of these sensitivity coefficients. A new realization is formed by the known method referred to as conditional kriging. It may follow therefrom that a change in the values at the pilot points, by using the sensitivity coefficients, leads to an undue change in the variogram even if conditional kriging is used afterwards, in particular when the number of pilot points becomes great.

SUMMARY OF THE INVENTION

The method according to the invention allows to carry out at least partial gradual deformation of the realization (or representation) of a Gaussian or similar type stochastic model of a heterogeneous medium such as an underground zone, constrained by a series of parameters relative to the structure of the medium. It is characterized in that it comprises drawing a number p at least equal to two of independent realizations of at least part of the selected medium model from all the possible realizations, and linear combination of these p realizations with p coefficients such that the sum of their squares is equal to 1. This linear combination constitutes a new realization of the stochastic model and it gradually deforms when the p coefficients are gradually modified.

More generally, the method can comprise several iterative stages of gradual deformation, with combination at each stage of a composite realization obtained at the previous stage with q new independent realizations drawn from all the realizations.

The method allows gradual deformation of a model representative of the medium while modifying the statistical parameters relative to the medium structure.

The method also allows to perform individual gradual deformations of various parts of the model while preserving continuity between these parts (i.e., for example, reproduction of a variogram linked with this model).

The coefficients of the linear combination preferably are trigonometric functions.

A Gaussian model or a model similar to the Gaussian type can be used as the model: lognormal model, truncated Gaussian model, etc.

In relation to the prior art, the method according to the invention is founded on a more solid theoretical basis for stochastic model deformation. It also makes it possible both to modify the parameters (often a priori uncertain values) of variograms and to deform a realization of a stochastic model. Finally, thanks to the possibility of individual deformation of various parts of the model, the method according to the invention gives greater flexibility and efficiency to the operator for adjustment of the stochastic model to the field reality. The method according to the invention thus allows to establish a connection between stochastic model adjustment and deterministic model adjustment by zoning conventionally used by reservoir engineers.

BRIEF DESCRIPTION OF THE FIGURES

Other features and advantages of the method according to the invention will be clear from reading the description hereafter of a non limitative example, with reference to the accompanying drawings wherein.

DETAILED DESCRIPTION OF THE INVENTION

General Points

The method according to the invention allows to gradually deform a stochastic model while respecting its statistical characteristics. This method is operational within a Gaussian framework. Combined with an optimization method, this method constitutes an efficient tool for calibrating an image of the medium to be modelled to non-linear data.

Gradual Deformation at the Set Statistical Parameters

Consider a series of possible realizations $R_i$ of a stochastic model of the medium to be modelled defined by a certain set of representative statistical parameters (average, variance, variogram, etc.). These various realizations $R_i$ are obtained from drawing a random germ; two successive values of this germ can lead to very different realizations.

Figure 1:
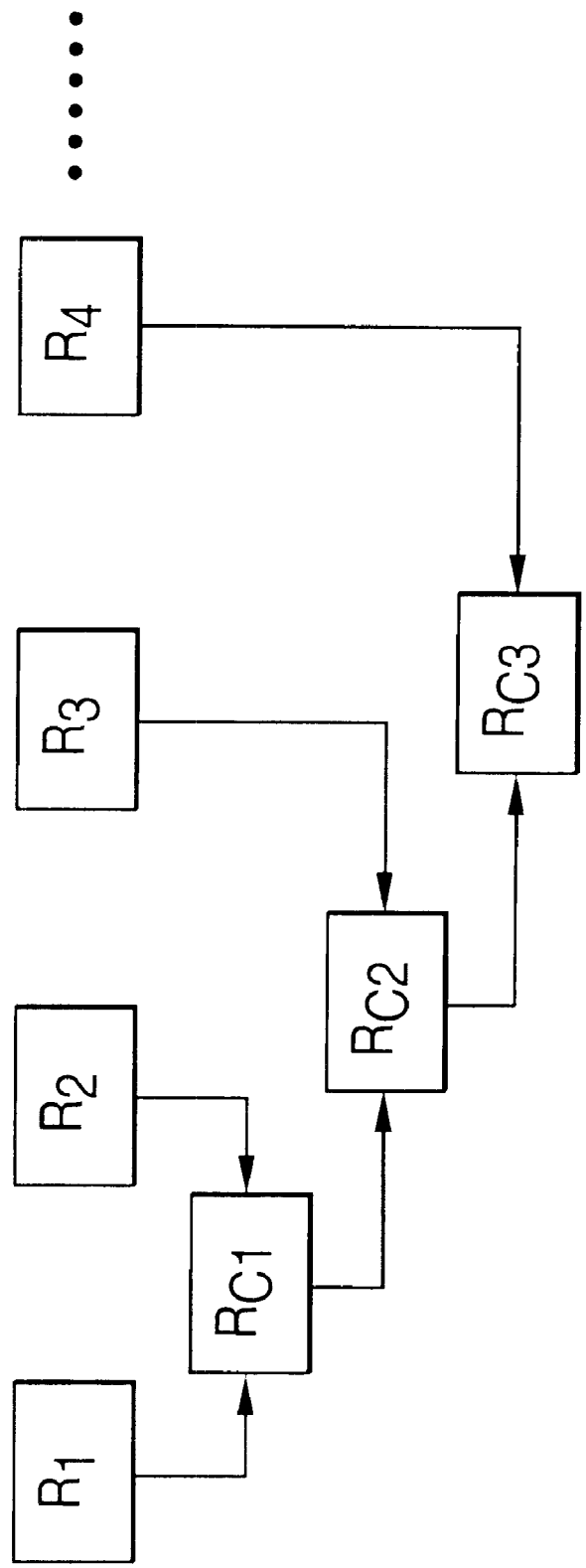
FIG. 1 shows an example of an iterative optimization pattern according to the method.

Gradual deformation of the model is obtained according to the method by a series of iterative combinations of realizations $R_i$ of the model. As shown in FIG. 1, the basic combination consists, from two realizations $R_1$, $R_2$ obtained by drawing, in forming a realization $R_{c1}$ meeting the relation as follows:

$$R_{c1} = \alpha_1 R_1 + \alpha_2 R_2 \qquad (1)$$

with the condition:

$$\alpha_1^2 + \alpha_2^2 = 1 \qquad (2)$$

This combined realization gradually deforms when coefficients $\alpha_1$ and $\alpha_2$ are gradually modified.

On the next iteration, another realization $R_3$ is drawn and combined according to the same rule with the previous combined realization $R_{c1}$.

$$R_{c2} = \alpha_3 R_{c1} + \alpha_4 R_3$$

The new coefficients of the combination also meet the condition:

$$\alpha_3^2 + \alpha_4^2 = 1$$

If the realization $R_3$ drawn leads to a combined realization that does not sufficiently match the measurements, one or more successive draws are performed until a satisfactory realization is obtained.

The previous combination pattern can be readily extended to any number of realizations. At the first combination stage, p different realizations are drawn and combination is performed according to the relation as follows:

$$R = \sum_i \alpha_i R_i \qquad (3)$$

with the condition:

$$\sum_i \alpha_i^2 = 1 \qquad (4)$$

At each of the next stages, the previous combined realization and q other realizations obtained by drawing are combined and combination thereof is achieved according to the same rule.

According to an advantageous implementation mode, two realizations $R_1$, $R_2$ connected by the relation:

$$R = R_1 \cos(\rho\pi) + R_2 \sin(\rho\pi) \qquad (5)$$

that meets condition (2) are combined at each stage.

Minimization of an objective function allows to determine coefficient ρ. It is a mono-parameter optimization problem.

In the more general case where p+1 realizations are used, we have a problem of optimization of the p parameters $\rho_i$ (i=1,2, ... ,p), and coefficients $\alpha_i$ (i=0,1,2, ... ,p) are written in the following form:

$$\begin{cases} \alpha_0 = \prod_{i=1}^{p} \cos(\rho_i \pi) \\ \alpha_i = \sin(\rho_i \pi) \prod_{j=i+1}^{p} \cos(\rho_j \pi) \quad (i = 1, p-1) \\ \alpha_p = \sin(\rho_p \pi) \end{cases}$$

that meet condition (4).

Gradual Deformation by Modifying the Statistical Parameters

If no precise values of the parameters of a stochastic model are available, these parameters must also be identified by inversion. The method according to the invention allows gradual deformation of a realization of a stochastic model by modifying the parameters of the variogram. To this end, a realization is written in the following form:

$$R = L[Y]$$

where Y is a white noise (realization of a Gaussian field without correlation), and L an operator determined by the variogram and allowing to turn Y into a realization R respecting this variogram. The techniques to be implemented here are well known to specialists. One of them is described by:

Oliver, D. S.: "Moving Averages for Gaussian Simulation in Two or Tthree Dimensions", Math. Geology, Vol. 27, No. 8, 1995.

We can thus deform Y as before while modifying the variogram operator L:

$$R = L[Y] = L[Y_1 \cos(\rho\pi) + Y_2 \sin(\rho\pi)]$$

where $Y_1$ and $Y_2$ are two white noises independent of each other.

Gradual Deformation by Parts

In order to improve efficiency of the calibration of a model to non-linear data distributed in the medium to be modelled, one may be led to divide the medium into several parts and to perform calibration part by part. The method according to the invention allows to carry out individual gradual deformations of various parts of the medium to be modelled while preserving continuity between these parts. Suppose that the medium is divided in n parts with which n white noises $Y_1, Y_2, \ldots, Y_n$ are associated. These white noises can be deformed individually by means of the previous algorithm and correlated by correlation operator L.

$$R = L[Y] = L \begin{bmatrix} Y_1 \\ Y_2 \\ \cdot \\ \cdot \\ \cdot \\ Y_n \end{bmatrix} = L \begin{bmatrix} Y_1 \cos(\rho_1 \pi) + Y_1 \sin(\rho_1 \pi) \\ Y_2 \cos(\rho_2 \pi) + Y_2 \sin(\rho_2 \pi) \\ \cdot \\ \cdot \\ \cdot \\ Y_n \cos(\rho_n \pi) + Y_n \sin(\rho_n \pi) \end{bmatrix}$$

where $Y_i^1$ and $Y_i^{11}$ (for i=1,2, . . . ,n) are two white noises independent of each other.

Extension to the Other Models

The gradual deformation method described above can be used in the case of models transformed from a Gaussian model such as the lognormal model and the truncated Gaussian model.

Validation Example

Figure 2A:
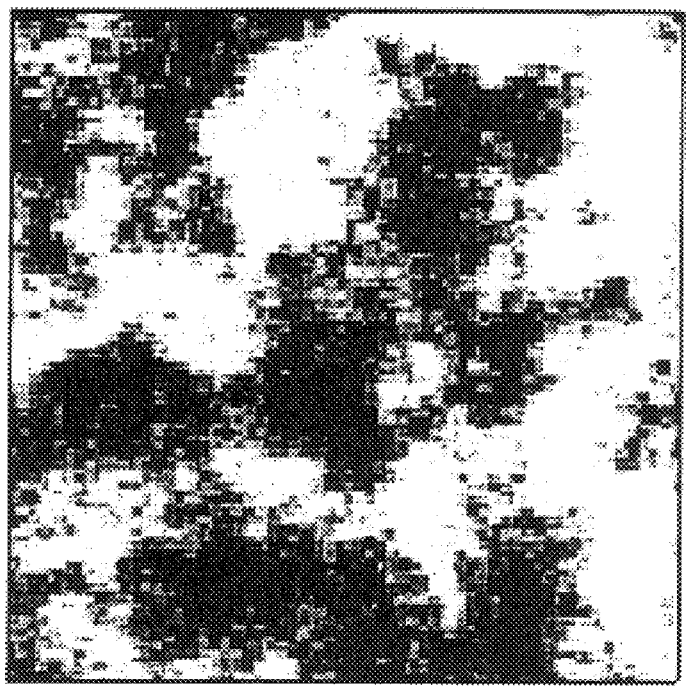
FIG. 2a shows an example of lognormal permeability field that constitutes a reference model.
Figure 2B:
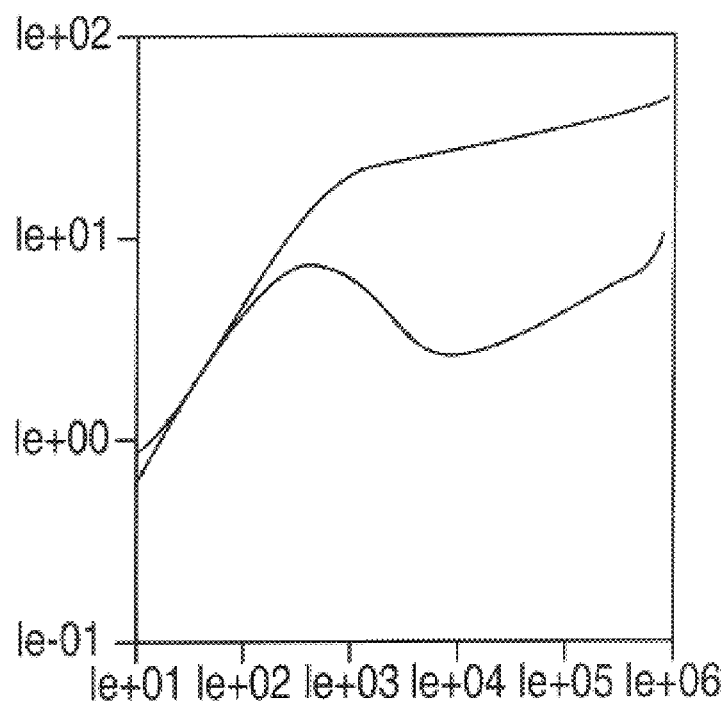
FIG. 2b shows the pressure and logarithmic derivative curves obtained from a numerical simulation of a well test in the reference model.

The method according to the invention is illustrated here by a synthetic study of the constraint of a permeability field by pressure data from a well test. A synthetic permeability field (FIG. 2a) constructed according to a lognormal stochastic model is used as a reference model. A numerical well test is carried out on this field and the result is a pressure curve and its logarithmic derivative as shown in FIG. 2b. What has to be done is to construct a realization constrained by this pressure curve other than the reference image.

Figure 3A:
FIG. 3a shows an example of a lognormal permeability field associated with a first realization of the model.
Figure 3B:
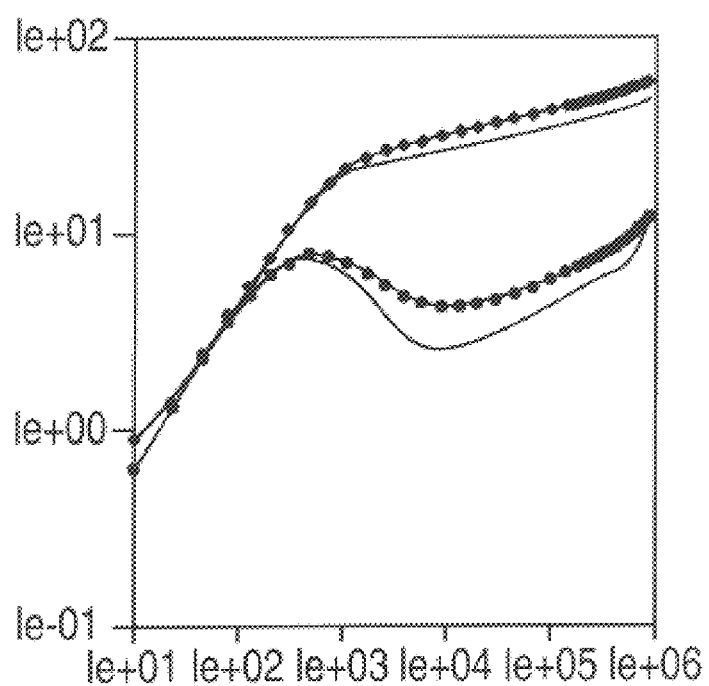
FIG. 3b shows a comparison between the pressure curves associated with realization 1 and the reference model respectively.
Figure 4A:
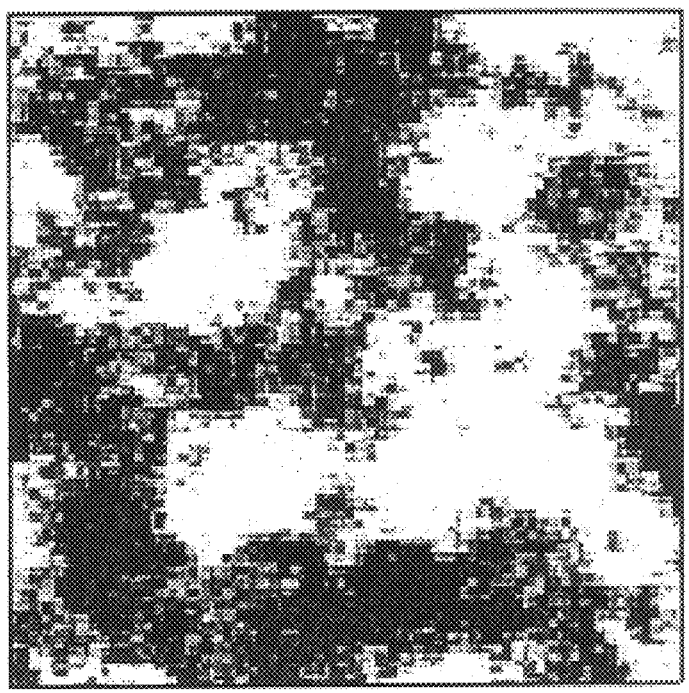
FIG. 4a shows an example of a lognormal permeability field associated with a second realization of the model.
Figure 4B:
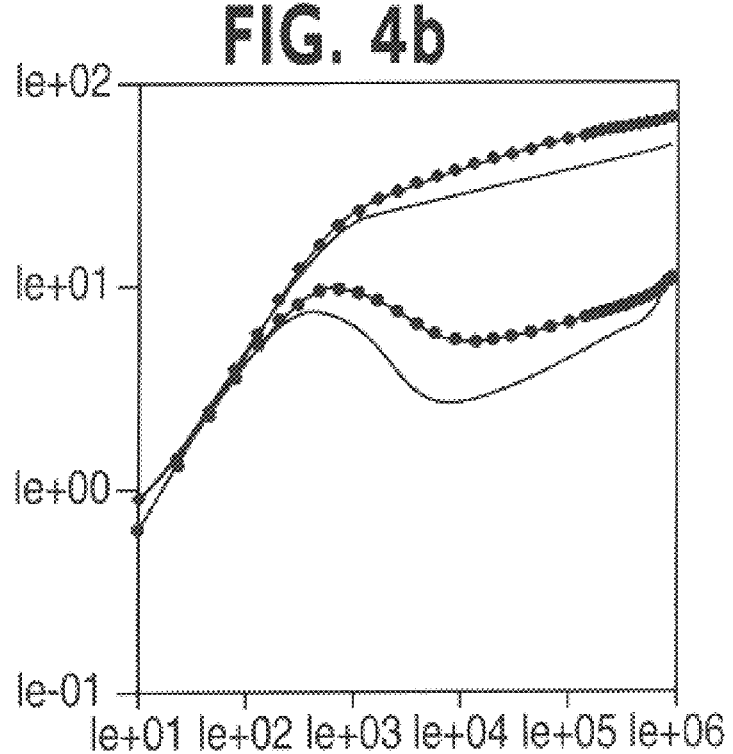
FIG. 4b shows a comparison between the pressure curves associated with realization 2 and the reference model respectively, FIGS. 5a and 5b respectively show the variation curves of the objective function as a function of parameter ρ in a linear scale and in a logarithmic scale.
Figure 5A:
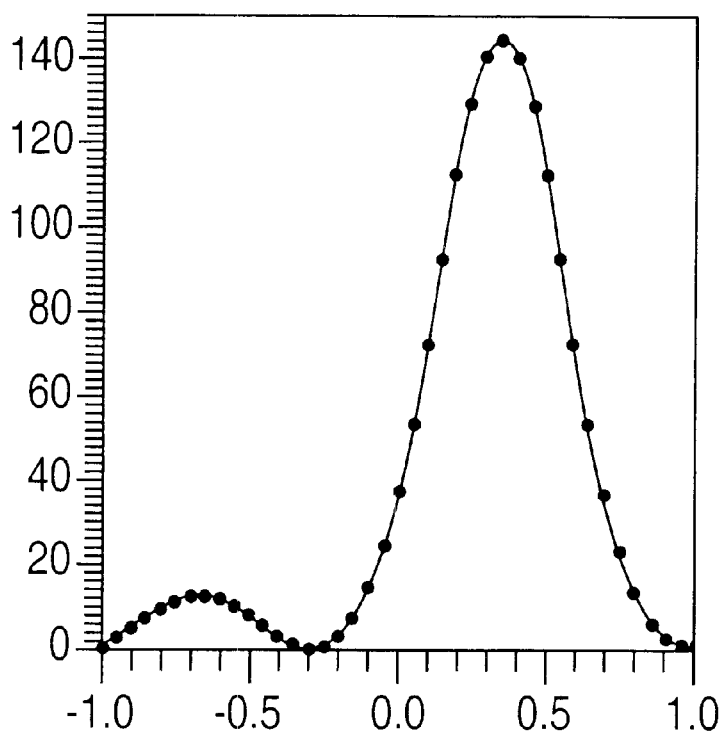
Figure 5B:
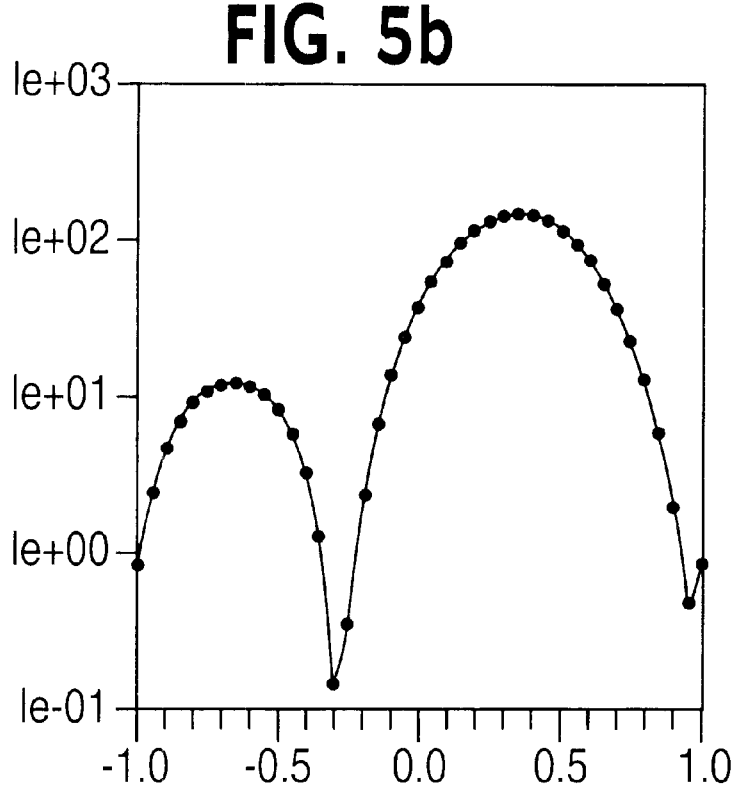
Figure 6A:
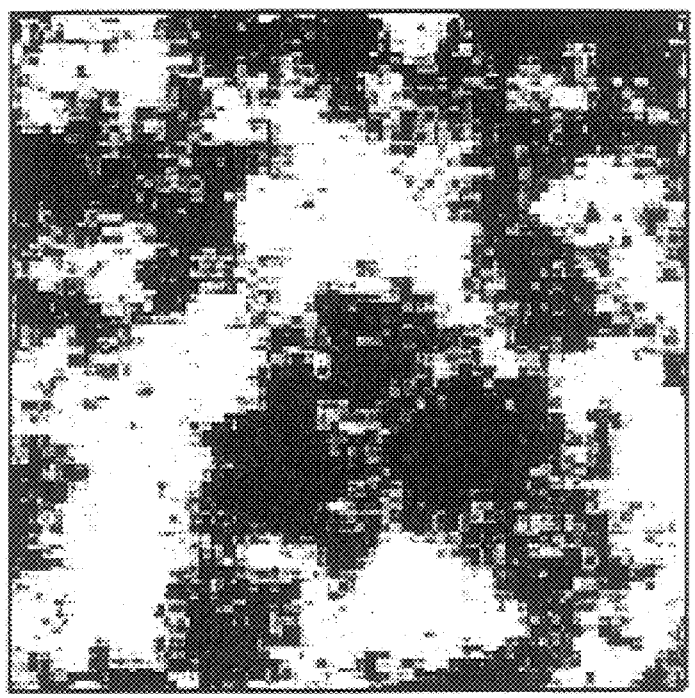
FIG. 6a shows an example of a lognormal permeability field associated with a realization constrained by application of the deformation method.
Figure 6B:
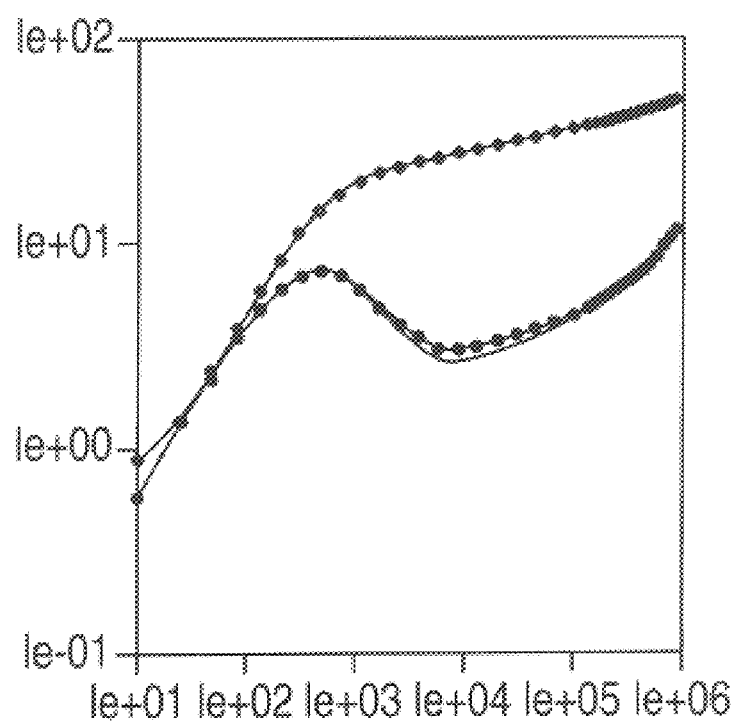
FIG. 6b shows a comparison between the pressure curves of the constrained realization and of the reference model.

FIGS. 3a and 4a show two independent realizations of the same model. It can be observed that the pressure curves of the well tests on these two realizations are very far from those of the reference model (FIGS. 3b and 4b). A chain of realizations has been constructed from these two realizations according to the rule given by formula (4). FIGS. 5a and 5b show the variation of the objective function as a function of parameter ρ (that ranges between −1 and 1). The two initial realizations respectively correspond to ρ=0 and ρ=0.5. It can be noticed that the objective function reaches its minimum value with ρ=−0.3 or thereabouts. 3 to 4 iterations are sufficient to minimize this function when using the gradient method. FIG. 6 shows the realization corresponding to ρ=−0.275 obtained by optimization and it can be seen that calibration of this realization to the well test is very satisfactory.

What is claimed is:

1. A method of providing an optimized Gaussian, optimized lognormal or optimized truncated Gaussian stochastic model of a distribution of a parameter in a heterogeneous underground medium by fitting a set of measured non linear data forming a response of the medium, comprising:
    a) generating a first realization of at least a part of the stochastic model and deducing therefrom a first set of non-linear data forming a response of the model;
    b) generating at least one other realization of a same part of the stochastic model independent from the first realization and deducing therefrom corresponding sets of non-linear data as a response of the model;
    c) forming a realization of the stochastic model by linearly combining the first realization and the at least one other realization, with coefficients of the combination being such that a sum of squares of the coefficients is equal to 1 and deducing therefrom a corresponding set of non-linear data as a response of the model;
    d) forming an objective function that measures a misfit between the sets of non-linear data deduced from step c) with corresponding non-linear data measured from the medium; and
    e) minimizing the objective function with respect to the coefficients of the combination of the realizations until an optimized realization of the stochastic model is obtained.

2. A method as claimed in claim 1, comprising:
performing iterative gradual deformation steps with a combining at each step of a composite realization obtained at a preceding step with at least one additional realization.

3. A method as claimed in claim 1, comprising:
performing gradual deformations of parts of the stochastic model while preserving continuity of the parameter between the parts by associating different white noises with the parts and then applying a correlation operator L defined by a variogram to all of the white noises.

4. A method as claimed in claim 1, comprising:
performing gradual deformation of the stochastic model while modifying statistical parameters relative to structure of the medium.

5. A method as claimed in claim 1, wherein:
coefficients ($\alpha_i$) of the linear combination are a function of sine and cosine functions.

6. A method as claimed in claim 2, wherein:
coefficients ($\alpha_i$) of the linear combination are a function of sine and cosine functions.

7. A method as claims in claim 3, wherein:
coefficients ($\alpha_i$) of the linear combination are a function of sine and cosine functions.

8. A method as claimed in claim 5, comprising:
deforming the stochastic model by linearly combining two realizations with coefficients ($\alpha_1$) and ($\alpha_2$) of the combination being respectively sine and cosine functions.

9. A method as claimed in claim 6, comprising:
deforming the stochastic model by linearly combining two realizations with coefficients ($\alpha_1$) and ($\alpha_2$) of the combination being respectively sine and cosine functions.

10. A method as claimed in claim 7, comprising:
deforming the stochastic model by linearly combining two realizations with coefficients ($\alpha_1$) and ($\alpha_2$) of the combination being respectively sine and cosine functions.

11. A method as claimed in claim 5, comprising:
deforming the stochastic model by linearly combining p+1 realizations where p>1, the coefficients ($\alpha_i$) of the combination being defined by the following relationships:

$$\begin{cases} \alpha_0 = \prod_{i=1}^{p} \cos(\rho_i \pi) \\ \alpha_i = \sin(\rho_i \pi) \prod_{j=i+1}^{p} \cos(\rho_j \pi) \quad (i = 1, p-1) \\ \alpha_p = \sin(\rho_p \pi). \end{cases}$$

12. A method as claimed in claim 6, comprising:

deforming the stochastic model by linearly combining p+1 realizations where p>1, the coefficients ($\alpha_i$) of the combination being defined by the following relationships:

$$\begin{cases} \alpha_0 = \prod_{i=1}^{p} \cos(\rho_i \pi) \\ \alpha_i = \sin(\rho_i \pi) \prod_{j=i+1}^{p} \cos(\rho_j \pi) \quad (i = 1, p-1) \\ \alpha_p = \sin(\rho_p \pi). \end{cases}$$

13. A method as claimed in claim 7, comprising:

deforming the stochastic model by linearly combining p+1 realizations where p>1, the coefficients ($\alpha_i$) of the combination being defined by the following relationships:

$$\begin{cases} \alpha_0 = \prod_{i=1}^{p} \cos(\rho_i \pi) \\ \alpha_i = \sin(\rho_i \pi) \prod_{j=i+1}^{p} \cos(\rho_j \pi) \quad (i = 1, p-1) \\ \alpha_p = \sin(\rho_p \pi). \end{cases}$$

14. A method as claimed in claim 8, comprising:

deforming the stochastic model by linearly combining p+1 realizations where p>1, the coefficients ($\alpha_i$) of the combination being defined by the following relationships:

$$\begin{cases} \alpha_0 = \prod_{i=1}^{p} \cos(\rho_i \pi) \\ \alpha_i = \sin(\rho_i \pi) \prod_{j=i+1}^{p} \cos(\rho_j \pi) \quad (i = 1, p-1) \\ \alpha_p = \sin(\rho_p \pi). \end{cases}$$

* * * * *